(12) United States Patent
Worman, Jr.

(10) Patent No.: US 7,425,006 B2
(45) Date of Patent: Sep. 16, 2008

(54) LIVE TWIST BEAM AXLE ASSEMBLY

(75) Inventor: William E. Worman, Jr., Washington Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 48 days.

(21) Appl. No.: 11/519,167

(22) Filed: Sep. 11, 2006

(65) Prior Publication Data
US 2008/0060866 A1 Mar. 13, 2008

(51) Int. Cl.
*B60G 11/18* (2006.01)
*B60G 9/00* (2006.01)
*B60K 17/34* (2006.01)

(52) U.S. Cl. .................. 280/124.166; 280/124.116; 280/124.156; 280/124.128; 301/124.1; 180/233

(58) Field of Classification Search .............. 267/273, 267/285; 301/124.1; 180/378, 382, 233, 180/238; 280/124.106, 124.107, 124.156, 280/124.128, 124.166, 787, 788, 124.169, 280/124.177
See application file for complete search history.

(56) References Cited

U.S. PATENT DOCUMENTS

| 1,129,021 A | | 2/1915 | Schmit |
|---|---|---|---|
| 1,192,376 A | | 7/1916 | Bingham |
| 1,309,074 A | | 7/1919 | McKinnon |
| 1,544,439 A | | 6/1925 | Fielder |
| 3,283,843 A | | 11/1966 | Runyan |
| 3,901,092 A | | 8/1975 | Romick |
| 4,637,271 A | * | 1/1987 | Giocastro et al. ............. 74/386 |
| 5,046,579 A | * | 9/1991 | Anderson .................. 180/340 |
| 5,215,329 A | | 6/1993 | Santo |
| 5,409,255 A | | 4/1995 | Alatalo et al. |
| 5,520,407 A | * | 5/1996 | Alatalo et al. ......... 280/124.166 |
| 5,813,691 A | | 9/1998 | Aoki et al. |
| 5,909,888 A | | 6/1999 | Betz et al. |
| 5,954,350 A | | 9/1999 | Santo et al. |
| 6,022,034 A | | 2/2000 | Santo et al. |
| 6,099,084 A | | 8/2000 | Bungarten et al. |
| 6,237,708 B1 | * | 5/2001 | Kawada ..................... 180/53.7 |
| 6,401,319 B1 | | 6/2002 | Hicks et al. |
| 6,447,073 B1 | | 9/2002 | Goettker |
| 6,516,913 B1 | | 2/2003 | Hartel et al. |
| 6,523,841 B2 | | 2/2003 | Glaser et al. |
| 6,533,300 B1 | | 3/2003 | Hicks et al. |
| 6,616,157 B2 | | 9/2003 | Christophliemke et al. |
| 6,676,228 B1 | | 1/2004 | Varela et al. |
| 6,702,057 B1 | * | 3/2004 | Bartel ........................ 180/292 |
| 6,702,308 B2 | | 3/2004 | Yamaguchi |
| 6,708,994 B2 | | 3/2004 | Etzold |
| 6,758,921 B1 | | 7/2004 | Streubel et al. |
| 6,829,826 B2 | | 12/2004 | Herzig |
| 7,048,087 B2 | | 5/2006 | Brill |
| 2004/0262070 A1 | * | 12/2004 | Uemura et al. .............. 180/378 |

* cited by examiner

*Primary Examiner*—Christopher Ellis
*Assistant Examiner*—Joseph Rocca
(74) *Attorney, Agent, or Firm*—Harness, Dickey & Pierce, P.L.C.

(57) ABSTRACT

A drive axle and suspension assembly for a vehicle having a power source and wheels including a torsionally compliant twist beam suspension and a driveline assembly. The twist beam includes a twist element defining a first lateral axis and arm portions adapted to rotatably support the wheels of the vehicle along a second axis extending substantially parallel to the first axis. The driveline assembly is adapted to receive torque from the power source and drive the wheels. The driveline assembly includes a plurality of power transmission rotatably supported by arm portions.

20 Claims, 4 Drawing Sheets

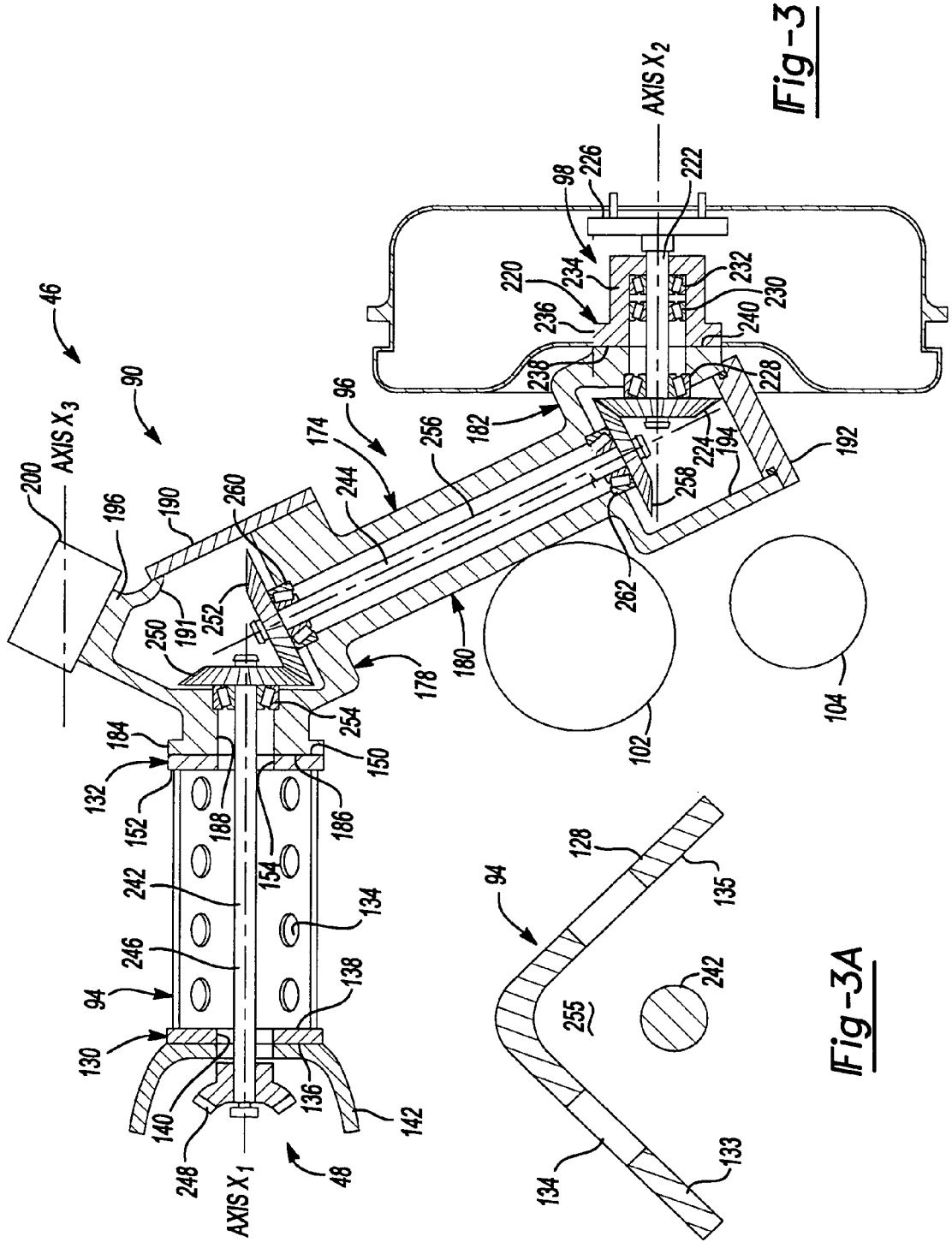

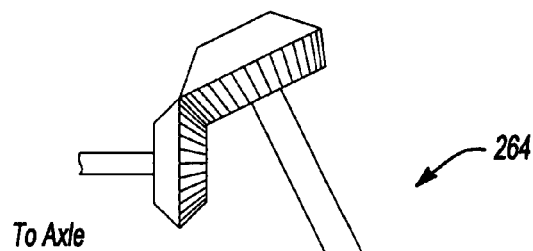
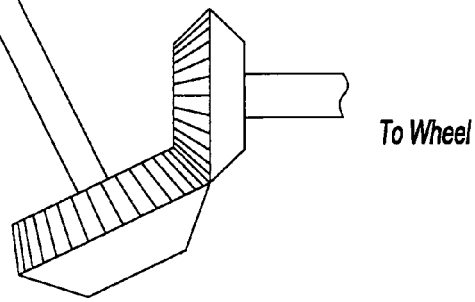
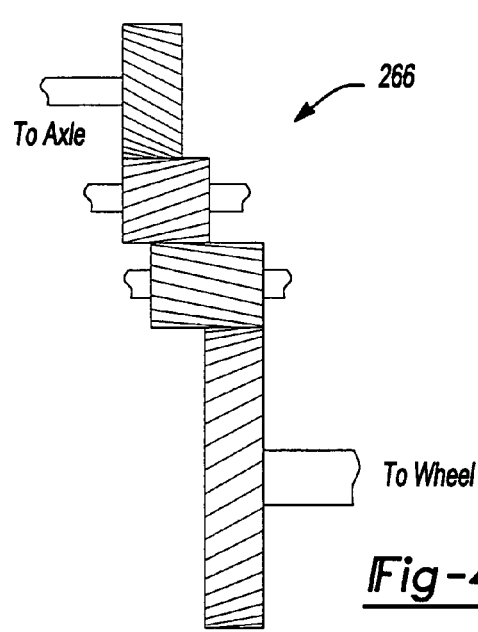
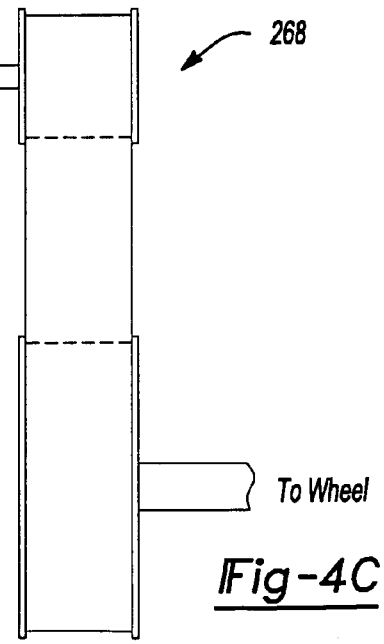

LIVE TWIST BEAM AXLE ASSEMBLY

BACKGROUND

The present disclosure generally relates to rear wheel drivelines and suspensions for use in motor vehicles. More particularly, the present disclosure relates to a twist beam rear axle and suspension assembly operable to transmit torque to the rear wheels of a vehicle.

Presently, a relatively high consumer demand for all-wheel drive vehicles exists. Manufacturers desire to quickly and cost effectively respond to this demand. To meet this goal, vehicle manufacturers have attempted to convert production front wheel drive vehicles into all-wheel drive vehicles. Driveline component packaging is a major challenge. Specifically, a mechanical connection between the vehicle's existing front wheel drive powertrain and its rear wheels is often times blocked by existing underbody components. Furthermore, the location of the spare tire and the spare tire well limits available driveline space.

Because the increase in demand for all-wheel drive vehicles has been great, various design strategies have been implemented to effectuate this conversion. Typical solutions include implementing alternate suspension systems to accommodate conventional rear driveline components. Other attempts include creating more complex powertrain components or reconfiguring and re-tooling the floorpan and chassis. While such strategies may work in a satisfactory manner, a need for a less complex and costly solution exists.

SUMMARY OF THE INVENTION

The present disclosure provides a drive axle and suspension assembly for a vehicle having a power source and wheels including a torsionally compliant twist beam suspension and a driveline assembly. The twist beam suspension includes a twist element defining a first lateral axis and arm portions adapted to rotatably support the wheels of the vehicle along a second axis extending substantially parallel to the first axis. The driveline assembly is adapted to receive torque from the power source and drive the wheels. The driveline assembly includes a plurality of power transmission components rotatably supported by arm portions.

BRIEF DESCRIPTION OF THE DRAWINGS

The disclosure will now be described, by way of example, with reference to the accompanying drawings in which:

FIG. 3 is a partial cross-sectional top view of a live twist beam axle assembly of the present disclosure;

FIG. 3A is a fragmentary cross-sectional view of the live twist beam axle assembly;

FIG. 4A is an exemplary spiral bevel gear drive incorporated with a live twist beam axle assembly of the present disclosure;

FIG. 4B is an exemplary helical gear drive incorporated with a live twist beam axle assembly of the present disclosure; and FIG. 4C is an exemplary belt or chain drive incorporated with a live twist beam axle assembly of the present disclosure.

DETAILED DESCRIPTION OF THE PREFERRED EMBODIMENT

The present disclosure is directed to a live twist beam axle assembly for use in a part or full-time all-wheel-drive motor vehicle equipped with a transversely mounted engine and transmission.

Figure 1:
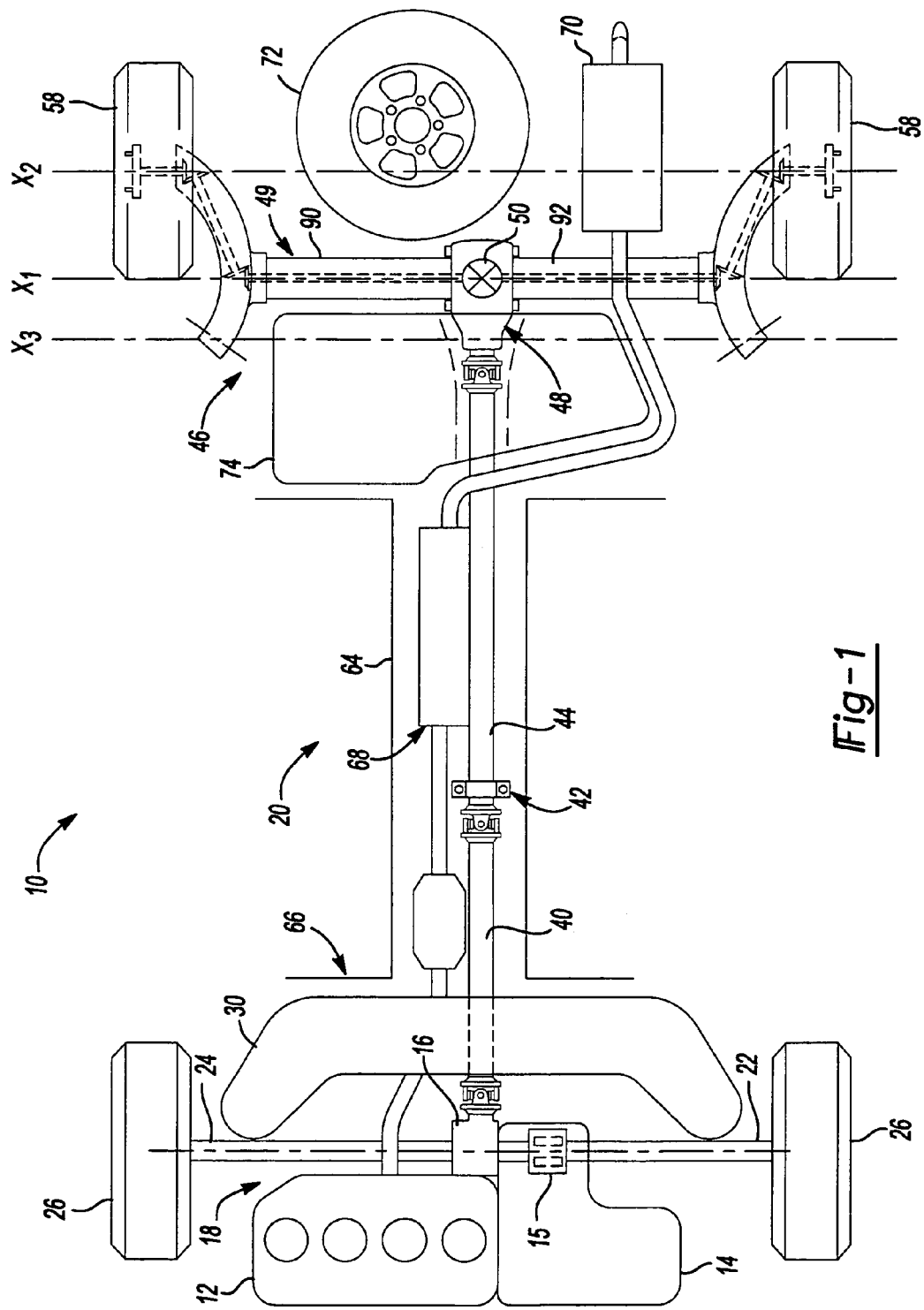
FIG. 1 is a schematic illustrating the drive train of a motor vehicle equipped with a live twist beam axle assembly of the present disclosure.

With particular reference to FIG. 1, a schematic of a motor vehicle 10 is shown to include a transversely mounted engine 12 and a transmission 14 adapted to deliver motive power (i.e., drive torque) to a front differential 15 and the input of a power take-off unit 16. Power take-off unit 16 is shown as a full time all-wheel drive system and is operable to transfer drive torque to a front driveline 18 and a rear driveline 20. However, power take-off unit 16 may be adapted for use in a part-time four-wheel drive system. Front driveline 18 includes a first output or left half-shaft 22 and a second output or right half-shaft 24 coupled to front differential 15. Half-shafts 22 & 24 are connected to a first or front pair of ground-engaging wheels 26. Components of front driveline 18 are located to provide clearance for a front suspension cross member 30.

Rear driveline 20 includes a forward propshaft 40, a center support 42, a rearward propshaft 44 and a live twist beam axle assembly 46. Axle assembly 46 includes a rear drive module (RDM) 48 and a twist beam suspension 49. One end of forward propshaft 40 is drivingly coupled to power take-off unit 16. The opposite end of forward propshaft 40 is drivingly coupled to one end of rearward propshaft 44 which is supported by vehicle structure via center support 42. The opposite end of rearward propshaft 44 is drivingly coupled to a differential 50 of RDM 48. RDM 48 includes a plurality of shafts described in detail herein that drivingly connect differential 50 to a second or rear pair of ground-engaging wheels 58.

In the exemplary vehicle described, a tunnel section 64 of floorpan 66 is formed to at least partially receive forward and rearward propshafts 40, 44 along with a substantial portion of an exhaust system 68. Furthermore, a muffler 70 of exhaust system 68, a spare tire tub 72 and a fuel tank 74 are affixed to vehicle 10. Other vehicle component packaging may exist without precluding use of the live twist beam axle assembly.

Figure 2:
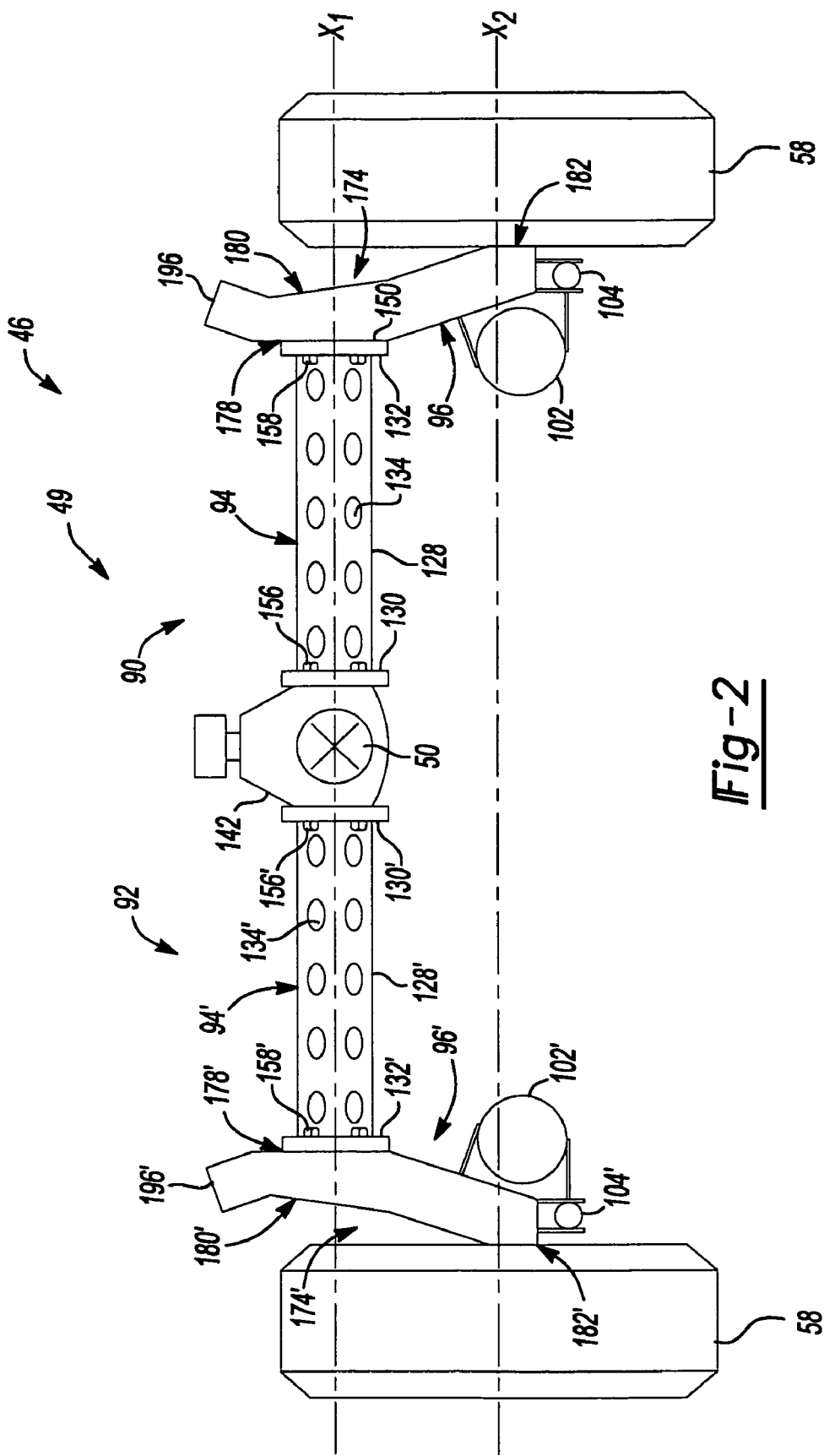
FIG. 2 is schematic showing a top view of a motor vehicle with a live twist beam axle assembly of the present disclosure.

With particular reference to FIGS. 2 through 4 of the drawings, twist beam suspension 49 of axle assembly 46 is shown to include a first or right portion 90 and a substantially similar second or left portion 92. Like elements are identified with similar reference numerals including a "prime" suffix. Due to the similarity of the first and second portions 90, 92, only portion 90 will be described in detail.

Portion 90 includes a twist element 94, an arm 96, a wheel interface assembly 98, a spring 102 and a shock absorber 104. Twist element 94 includes a torsionally compliant "L"-shaped element 128, a first flange 130 and a second flange 132. As shown in FIG. 3A, element 128 includes a first substantially planar leg 133 intersecting a second substantially planar leg 135 at approximately 90 degrees. First leg 133 and second leg 135 extend between first flange 130 and second flange 132. Element 128 includes a plurality of oval shaped apertures 134 extending therethrough. Apertures 134 are evenly distributed and axially spaced apart from one another. Apertures 134 are sized and positioned to provide mass reduction.

First flange 130 is shaped as a substantially flat plate radially outwardly extending beyond and welded to element 128. First flange 130 includes an outer surface 136, an inner surface 138 and an aperture 140. Outer surface 136 engages a case or axle housing 142 rotatably supporting differential 50. Second flange 132 is substantially similar to first flange 130 and is plate-shaped having an outer surface 150, an inner surface 152 and an aperture 154. First and second flanges 130, 132 are fixed to element 128. Flanges 130 and 132 are parallel to each other and perpendicular to an axis $X_1$ laterally extending through element 128. First flange 130 is mounted to case 142 by fasteners 156. Second flange 132 is fixed to arm 96 by fasteners 158.

Arm 96 includes a substantially hollow housing 174 having a first shoulder portion 178, a main portion 180, and a second shoulder portion 182. First shoulder portion 178 includes a flange 184 substantially similar to second flange 132 of twist element 94. An outer face 186 of flange 184 is fixed to outer surface 150 of second flange 132. An aperture 188 extends through first shoulder portion 178 and is aligned with aperture 154. First shoulder portion 178 further includes a first access panel 190 removably fixed to housing 174 enclosing an aperture 191. Second shoulder portion 182 also includes a second access panel 192 removably fixed to housing 174 enclosing an aperture 194.

A boss 196 is formed on arm 96 in communication with a body mount bushing 200. Body mount bushing 200 is located between and coupled to both boss 196 of housing 174 and the chassis of motor vehicle 10. Spring 102 and shock absorber 104 are also coupled to arm 96 at one end and the vehicle chassis at their opposite ends.

Wheel interface assembly 98 includes a hollow support member 220 rotatably supporting an output shaft 222. An output gear 224 is fixed for rotation with or integrally formed on one end of output shaft 222. A wheel hub 226 is fixed for rotation with or integrally formed on the opposite end of output shaft 222. Output shaft 222 is rotatably supported in housing 174 by a bearing 228 and in support member 220 by bearings 230, 232 for rotation about an axis $X_2$. Support member 220 includes a body portion 234 and a flange portion 236. Flange portion 236 includes a face 238 abutting a face 240 of second shoulder portion 182 of housing 174. Support member 220 is fixed to housing 174 via fasteners (not shown). When functioning as a suspension in receipt of road load input, live twist beam axle assembly 46 rotates about an axis $X_3$ that is offset from axes $X_1$ and $X_2$.

As shown in FIG. 3, RDM 48 includes an axle shaft 242 drivingly connected to an intermediate or transfer shaft 244 which, in turn, is drivingly connected to output shaft 222. Axle shaft 242 includes a body 246, a first gear 248 and a second gear 250. First and second gears 248, 250 may be drivingly connected to or integrally formed on body 246. First gear 248 functions as a side gear of differential 50. Second gear 250 is drivingly engaged with a third gear 252 drivingly connected to one end of intermediate shaft 244. Axle shaft 242 extends through aperture 140, adjacent to element 128, and through aperture 154 of twist element 94. Axle shaft 242 is rotatably supported in housing 174 of arm 96 by a bearing 254. Axle shaft 242 is at least partially positioned within a pocket 255 defined by first leg 133 and second leg 135 of element 128. As such, axle shaft 242 is partially encompassed by element 128.

Intermediate shaft 244 includes third gear 252, a body 256 and a fourth gear 258. Third and fourth gears 252, 258 may be fixed for rotation with or integrally formed on body 256. Fourth gear 258 is drivingly engaged with output gear 224 of wheel interface assembly 98. Intermediate shaft 244 is rotatably supported in housing 174 by bearings 260 and 262. While bevel gears are depicted in FIG. 3, it should be noted that the torque transmitting elements of arm 96 may also include, but are not limited to, bevel gears 264 as shown in FIG. 4A, helical gears 266 depicted in FIG. 4B or belt or chain drives 268 shown in FIG. 4C.

Manufacturing and packaging the components of axle assembly 46 as stated eliminates the need to replace a twist beam suspension with an alternative suspension design to allow for packaging space for typical driveline components. Furthermore, the need for integrating more complex and costly drive components is also eliminated. Axle assembly 46 contains a portion of the desired mechanical connection between the vehicle's existing powertrain and rear wheel hubs 226, 226' by making use of existing packaging space within the twist beam suspension design. This strategy effectively overcomes the costly packaging and re-tooling barriers mentioned earlier requiring far less change to the basic vehicle design.

RDM 48 of axle assembly 46 functions as a torque transfer mechanism between rearward propshaft 44 and wheels 58. In addition, twist beam suspension 49 of axle assembly 46 functions to isolate and otherwise account for road load input forces applied to wheels 58 during vehicle operation. These forces are transmitted from support members 220, 220' through arms 174, 174' to body mount bushings 200, 200'. Individual wheel inputs differing from side to side apply both torsion and moment loads on twist elements 94, 94'. Twist elements 94, 94' are designed to torsionally deflect or "wrap-up" acting as springs. Shock absorbers 104 and springs 102 function to further isolate motor vehicle 10 from the input forces.

The foregoing discussion discloses and describes various embodiments of the present disclosure. One skilled in the art will readily recognize from such discussion, and from the accompanying drawings and claims, that various changes, modifications and variations can be made therein without departing from the true spirit and fair scope of the disclosure as defined in the following claims.

What is claimed is:

1. A drive axle and suspension assembly for an all-wheel-drive vehicle having an engine, front wheels and rear wheels, the axle and suspension assembly comprising:
  a rear axle housing;
  a first twist element fixed to the axle housing;
  a second twist element fixed to the axle housing;
  a first axle shaft rotatably positioned adjacent the first twist element and adapted to receive drive torque from the engine;
  a second axle shaft rotatably positioned adjacent the second twist element and adapted to receive drive torque from the engine; and
  first and second transfer shafts each drivingly coupled to the respective first and second axle shafts, each transfer shaft being adapted to transfer torque to one of the rear wheels, wherein the first and second twist elements form part of the vehicle suspension, each twist element being operable to store and release energy as a torsion spring.

2. The assembly of claim 1 wherein the rear axle housing rotatably supports a differential gear assembly.

3. The assembly of claim 2 wherein a first gear of the differential gear assembly is fixed for rotation with the first axle shaft and a second gear of the differential gear assembly is fixed for rotation with the second axle shaft.

4. The assembly of claim 3 further comprising:
  first and second arms rotatably supporting the respective first and second transfer shafts, the first and second arms each having a first portion fixed to a corresponding first and second twist element;
  first and second support members fixed to a second portion of each of the first and second arms; and
  first and second output shafts rotatably supported by the respective first and second support members, the first and second output shafts transferring drive torque from the respective first and second transfer shafts to the rear wheels.

5. The assembly of claim 4 further including first and second springs as well as first and second shock absorbers coupled to the respective first and second arms.

6. The assembly of claim 1 wherein the first and second twist elements each include a plurality of apertures extending therethrough.

7. The assembly of claim 1 wherein the first twist element includes an "L"-shaped cross-section.

8. The assembly of claim 7 wherein the first axle shaft is at least partially positioned within a pocket defined by the first twist element.

9. The assembly of claim 1 further including first and second output shafts, each output shaft drivingly coupled to respective first and second transfer shafts, each output shaft being fixed for rotation with a wheel hub.

10. The assembly of claim 9 wherein each of the first and second axle shafts, the first and second transfer shafts and the first and second output shafts have gears fixed for rotation therewith.

11. The assembly of claim 9 wherein the first axle shaft is fixed for rotation with a first gear in meshing engagement with a second gear fixed for rotation with the first transfer shaft, the assembly further including a third gear fixed for rotation with the first transfer shaft and in meshed engagement with a fourth gear fixed for rotation with the first output shaft.

12. An axle and suspension assembly for a vehicle having a chassis, a power source and wheels, comprising:

first and second torsionally compliant twist elements defining a first lateral axis;

arm portions fixed to each of the first and second twist elements and adapted to rotatably support two of the wheels of the vehicle along a second axis extending substantially parallel to the first axis; and a driveline assembly adapted to receive torque from the power source and drive the wheels, the driveline assembly including a plurality of power transmission components rotatably supported by the arm portions.

13. The assembly of claim 12 wherein the arm portions are pivotable relative to the vehicle chassis about a third axis offset from the first and second axes.

14. The assembly of claim 13 wherein the driveline includes a differential gear assembly.

15. The assembly of claim 14 wherein the differential gear assembly includes a side gear fixed for rotation with one of the power transmission components.

16. The assembly of claim 12 wherein each of the twist elements includes first and second substantially planar leg portions interconnected to one another at one edge.

17. The assembly of claim 16 wherein a portion of the driveline assembly is positioned within a pocket defined by the leg portions.

18. The assembly of claim 12 wherein two of the power transmission components are shafts drivingly interconnected by a flexible member.

19. The assembly of claim 12 wherein two of the power transmission components are shafts drivingly interconnected with gears.

20. The assembly of claim 19 wherein two of the power transmission components are shafts drivingly interconnected with bevel gears.

* * * * *